United States Patent [19]

Armel

[11] Patent Number: 5,080,553
[45] Date of Patent: Jan. 14, 1992

[54] TURBO WIND ENGINE

[76] Inventor: Louis Armel, 9, rue des Gournaux, 60200 Compiègne, France

[21] Appl. No.: 432,768

[22] PCT Filed: Feb. 22, 1989

[86] PCT No.: PCT/FR89/00070

§ 371 Date: Oct. 24, 1989

§ 102(e) Date: Oct. 24, 1989

[87] PCT Pub. No.: WO89/08187

PCT Pub. Date: Sep. 8, 1989

[30] Foreign Application Priority Data

Feb. 25, 1988 [FR] France .................. 88 02284

[51] Int. Cl.⁵ .................. F03D 7/00; F03D 1/00
[52] U.S. Cl. .................. 415/4.2; 415/4.3; 416/10
[58] Field of Search .................. 416/9, 10, 11, 12, 13; 415/4.1, 4.2, 4.3, 4.4, 4.5, 2.1, 905, 907, 908

[56] References Cited

U.S. PATENT DOCUMENTS

| 997,802 | 7/1911 | Geofroy | 415/4.2 |
|---|---|---|---|
| 1,645,855 | 10/1927 | De Vore | 415/907 |
| 1,764,052 | 6/1930 | Pfeifer | 415/907 |
| 3,228,475 | 1/1966 | Worthmann | 416/11 |
| 3,938,907 | 2/1976 | Magoveny et al. | 415/907 |
| 4,047,834 | 9/1977 | Magoveny et al. | 415/907 |
| 4,084,918 | 4/1978 | Pavlecka | 415/2.1 |
| 4,154,556 | 5/1979 | Webster | 415/4.2 |
| 4,159,191 | 6/1979 | Graybill | 416/11 |
| 4,365,929 | 12/1982 | Retz | 415/907 |
| 4,432,695 | 2/1984 | Voitsekhovsky et al. | 416/17 |
| 4,781,523 | 11/1988 | Aylor | 415/215 |

FOREIGN PATENT DOCUMENTS

| 152387 | 3/1907 | Fed. Rep. of Germany . |
|---|---|---|
| 804090 | 4/1951 | Fed. Rep. of Germany . |
| 3047501 | 7/1982 | Fed. Rep. of Germany . |
| 1338164 | 11/1962 | France . |
| 2295256 | 7/1976 | France . |
| 2503270 | 10/1982 | France . |
| 2505938 | 11/1982 | France .................. 416/11 |
| 2507252 | 12/1982 | France . |
| 8707328 | 12/1987 | PCT Int'l Appl. . |

Primary Examiner—Edward K. Look
Assistant Examiner—Hoang Nguyen
Attorney, Agent, or Firm—Wood, Phillips, Mason, Reckentenwald & VanSanten

[57] ABSTRACT

A wind engine has a propeller which is a conical or flat wheel obligatorily surrounded by depression creating deflectors, and the blades of the propeller, occupying the quasi-totality of the propeller surface, are directly obliquely attacked by the wind, in the case of the conical rotor or, in the case of the flat wheel, after deviation by a grid of deflectors.

16 Claims, 2 Drawing Sheets

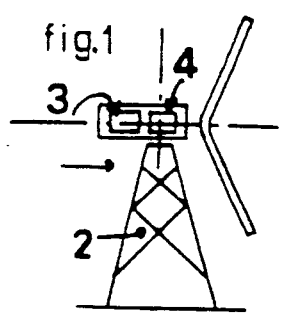
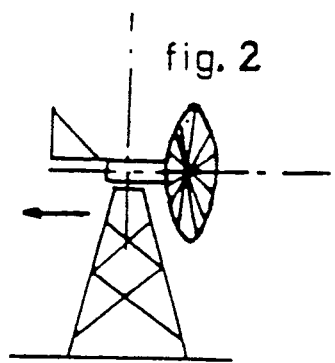
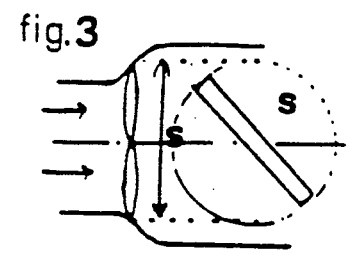
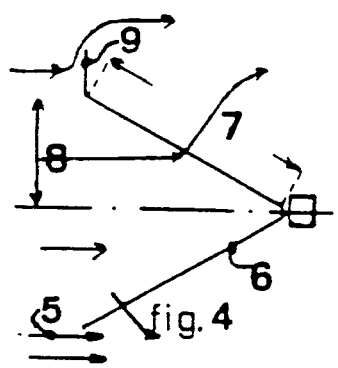
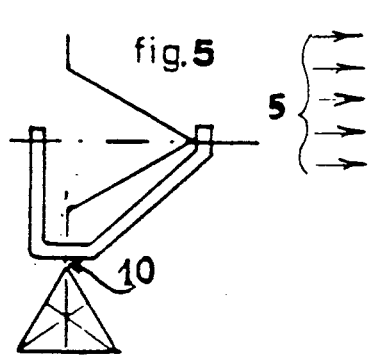
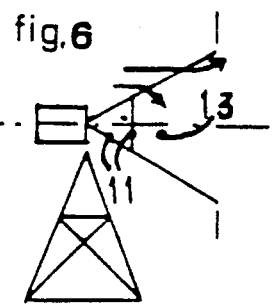
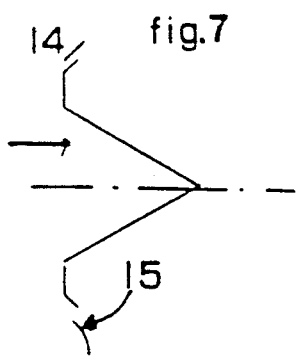
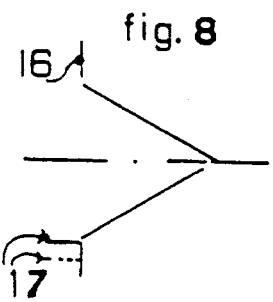
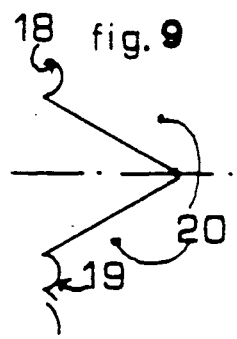
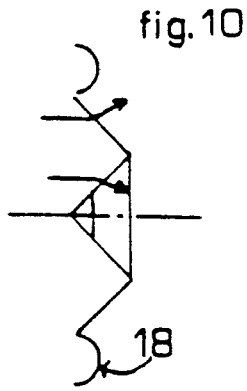
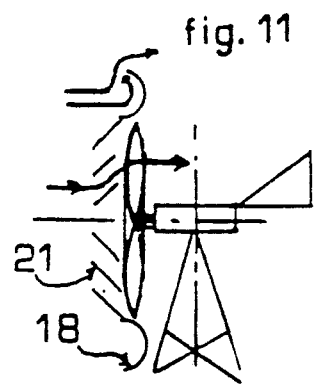
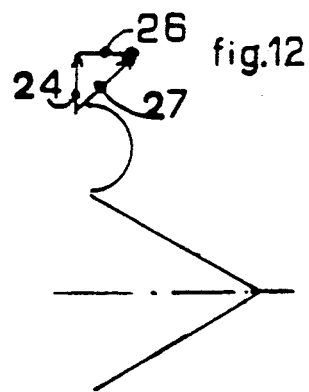

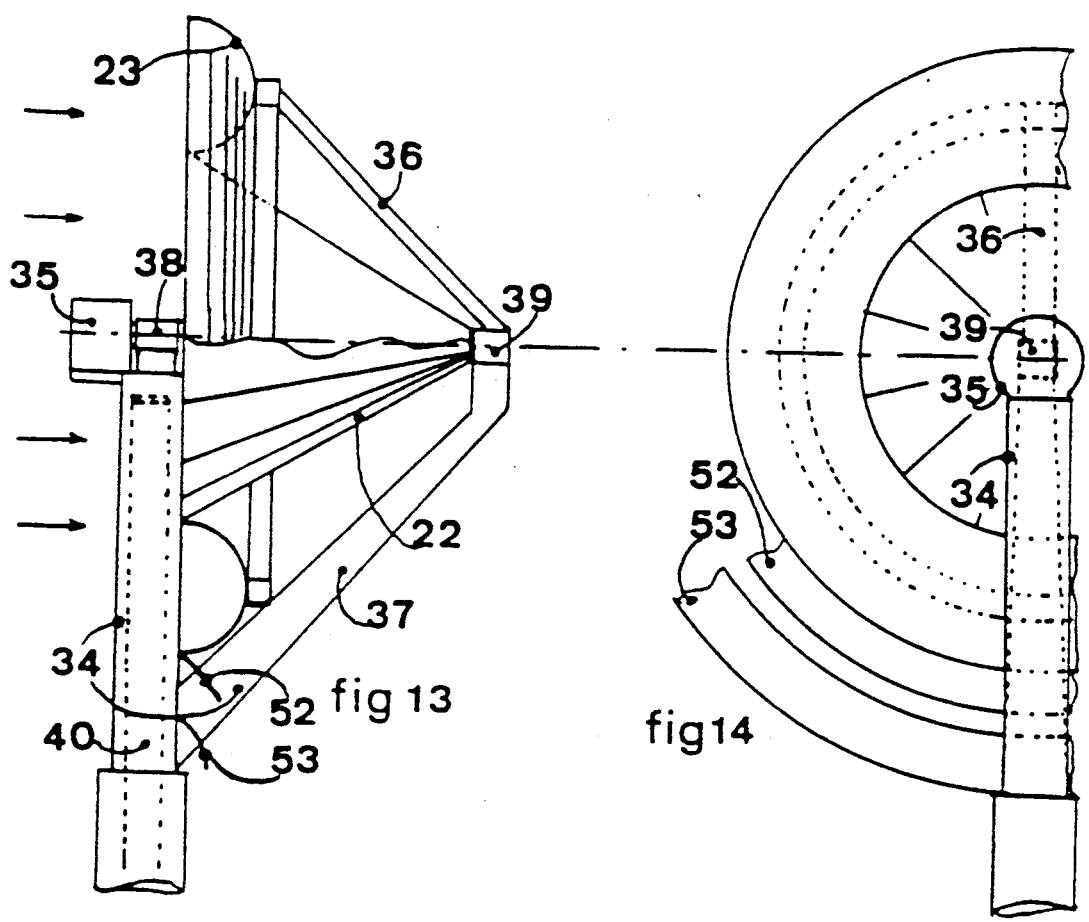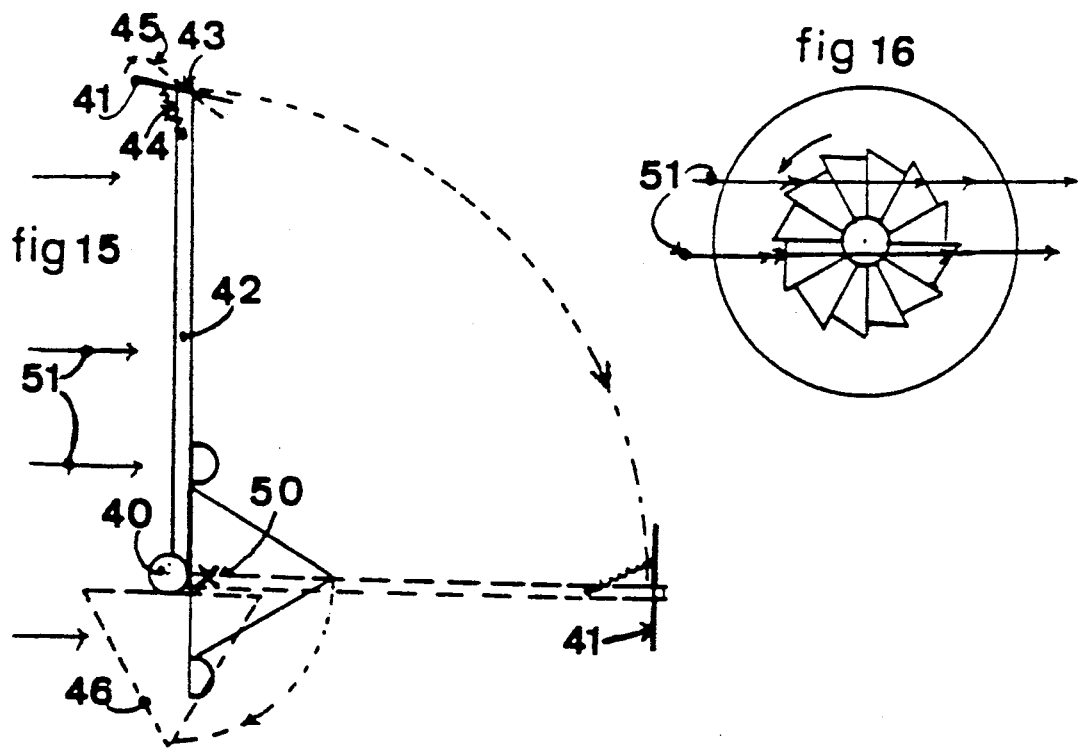

TURBO WIND ENGINE

BACKGROUND OF THE INVENTION

1. Field of the Invention

The invention relates to a wind engine, and more particularly to a wind engine formed by a multi-bladed, conical turbine, surrounded by a circulary deflector.

2. Background Art

The present wind engines FIG. 1) are generally constituted of a two- or three-bladed propeller rotating at the top of a pylon (2), and driving an electric generator (3) by means of a step-up gear (4).

The small pitch of the propellers together with their considerable weight imposes to start them by means of an auxiliary motor when the variable incidence blades, which are also operated by another auxiliary motor, are not sufficient. Their low rotation speed obliges to provide them with a coupling and with a high ratio step-up gear which is expressive and subject to wear. The whole has to be directed, without disturbing oscillations, into the direction of the wind, which imposes to use a new auxiliary motor and several correction members.

The successive automatisms often act adversely due to fast and repeated variations of the wind in intensity as well as in direction, resulting in a destruction of the best devices which have become moreover exaggeratedly expensive.

Not only the life of the parts which do most of the work doesn't reach ten years, but the growing dimensions of the propellers make their longevity uncertain even as the cost price of the generated energy being already too high.

The so-called American, multi-bladed propeller wheels FIG. 2), which are less fragile but very slow and which are still manufactured, especially for pumping water, have obtained the wrong idea, that they are on principle slow.

The maximum power of a wind engine is given by the formula of BET2: $P_{max}=0.37 \, SV^3$ wherein $V =$ speed of wind and $S =$ section of the airflow traversing the wind engine (FIG. 3). This surface S, generally called "the surface swept by the propeller" which expression is correct if the propeller intercepts the entire volume of the airflow, but incorrect if the blades subjected to the wind catch only a small part of the airflow (FIG. 3). This explains the small efficiencies of classical wind engines with respect to that surface (less than 30%). The manufacturers deluded with this unlucky expression, now run into the difficulties inherent to giant two-bladed propellers.

The multi-bladed wheels do not allow the air, that has worked and slowed down, to dilate when leaving the blades, moreover due to the fact that the peripheral wind (5, FIG. 4) beats the air back towards the center. The present invention is directed towards overcoming one or more of the problems discussed above.

SUMMARY OF THE INVENTION

An object of the present invention, therefore, is to provide a wind engine characterized in that the propeller is a conical or flat wheel obligatorily surrounded by depression-creating deflectors, and the blades of said propeller, occupying the quasi-totality of the surface, are directly obliquely attacked by the wind, in the case of the conical rotor or, in the case of the flat wheel, after deviation by a grid of deflectors. To realize said solution to the above problem, the blades of our turbine are arranged obliquely with respect to the direction of the wind (6—FIG. 4). After having driven the blades, the slowed down air enters a space (7—FIG. 4) larger than the one through which is has arrived (8—FIG. 4) and it can expand by leaving the blades perpendicularly.

The exterior wind (5) is deviated by a peripheral deflector (9 FIG. 4) in order not to obstruct the evacuation of the air which has worked. In small models, this preferably independent, deflector can be a part of the turbine in order to reduce the cost price (FIG. 5). The turbine looks like a funnel catching the wind and is shifted towards the back of the axis (10—FIG. 5) in order to be able to align itself. In order to facilitate the automatic orientation, the front can also be directed forwards provided that an expansion zone (13—FIG. 6) is provided in the center by means of a cone or a tight plate (11—FIG. 6).

The external deflectors, which are necessary in all cases, can be provided with slots with airplane wings (14—FIG. 7) or for creating the "Coanda" effect (15). They can be formed by a flat ring (16—FIG. 8) whether or not provided at its entry with a cylinder (17—FIG. 8) which canalizes the air to the one or the other side or preferably with a hollow ring (18-19—FIG. 9) the Cx of which is at maximum. Their role is essential by creating a supplementary depression (20) at the back of the turbine which increases the speed of the air and thus also the power.

The combination of the systems of FIG. 6 and FIG. 7, according to FIG. 10, having a frustum of a cone reversed in the center according to a cone directed towards the wind, results into a less deep device.

A fourth solution consists in the use of a flat classical wheel (FIG. 11) preceded by a grid of deflectors 21 canalizing the wind obliquely with respect to the blades, the peripheral deflector 18 remaining indispensable. In contrast with certain projects, the driving blades are situated in the center which leads to the following advantages: lightness, speed, solidity, possibility of putting a collar, the thus constructed turbine being obligatorily surrounded by deflectors having a double function: forming the dilatation space and acceleration of the deviated air (increasing the depression).

The wind-velocity (26—FIG. 12) vectorially summed with the velocity of the leaving wind 2 gives a larger resultant which is function of the direction of (24).

CALCULATION OF THIS INCREASE

Consider the formula of the drag:

$$\text{Drag} = C_x \times \tfrac{1}{2}\rho \times S \times V^2 \quad \rho = \text{specific weight of the } m^3.$$

Since $\rho$ of air $= 1.25$ and the unit surface being $S=1 \, m^2 = 1$, the drag equals thus $\text{Drag} = C_x \times \tfrac{1}{2} \times 1.25 \, V^2 = 0.62 \, C_x V^2$ (A). The $C_x$ specifies the effect of the obstacle on the drag, thus on the wind. As $C_x = (\sqrt{C_x})^2$ and if one supposes that V resultant $= V_R = V \times \sqrt{C_x}$, the formula (A) becomes: $\text{Drag} = 0.62 \, V^2_R$. Knowing the drag, and thus the $C_x$, by laboratory measurings, the wind velocity particularly for the gutter-shaped deflector is thus: $V_R = V \times \sqrt{C_x} = V \times \sqrt{2.3} = V \times 1.51$, the $C_x$ of the gutter being equal to 2.3.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description taken in conjunction with the accompanying drawings, which like reference numerals identify like elements in the figures and in which:

FIG. 1 is a perspective view of a prior art wind engine;

FIG. 2 is a perspective view of a wind engine having a multibladed propeller wheel;

FIG. 3 is a fragmentary view of a propeller immersed in a traversing airflow through a wind machine;

FIG. 4 is a fragmentary view of the blades of the present invention arranged obliquely with respect to wind direction;

FIG. 5 is a perspective view of a turbine in the present invention;

FIG. 6 illustrates an expansion zone in the center of the turbine of FIG. 5;

FIG. 7 illustrates slots on the external deflectors of the present invention;

FIG. 8 illustrates a flat ring forming the external deflectors;

FIG. 9 illustrates a hollow ring for canalizing air;

FIG. 10 illustrates a combination of the systems shown in FIG. 6 and 7;

FIG. 11 illustrates a wind engine having a flat classical wheel;

FIG. 12 graphically illustrates a vectorial summation of wind velocity;

FIGS. 13, 14, and 15 show a wind engine according to the present invention; and

FIG. 16 is an end view of a turbine in the wind engine of FIGS. 13-15.

DESCRIPTION OF THE PREFERRED EMBODIMENT

FIGS. 13, 14 and 15 show a wind engine according to the present invention, which wind engine comprises a turbine 22 having conically disposed blades, the top of which cone is at the back as a funnel catching the wind. This turbine is surrounded by a hollow deflector (23) having the shape of a circular gutter, the hollow being facing the wind which compresses itself thereon. The generator (35—FIG. 13) is placed in front of the turbine in order to facilitate the balancing of the whole even as its linking up with the utilization: for example collars over which rub graphite brushes for the electricity, tube having turning sleeves for compressed air, these means being in current use. The support (34—FIG. 13) supports the fixed deflector by means of the bearers 36 and 37 and the turbine by means of the bearings 38 and 39 on which the turbine rotates. The support together with the complete head of the wind engine swivels horizontally around a perpendicular axis (40) according to the direction of the wind, the application center of the forces due to the wind (50—FIG. 15) passing behind the axis (40). In case of a storm, the security is assured in a classical way, the whole swivelling a quarter of a turn around its axis due to the panel (41—FIG. 15) hingedly connected by its middle 43 to the extremity of an arm 42 and kept in work position by means of a spring 44. When the wind is too heavy, the panel 41 takes suddenly the position 45, FIG. 14, in which the wind catchment is increased, which drives the turbine and its deflector to the sideways position (46—FIG. 15). In this position, the rudder 41 catches the most wind and keeps the wind engine firmly into this position as far as the wind does not drop strongly. Not only the surface oriented towards the wind but also its form coefficient is reduced, the applied force changes from eight to about one. The torque created by the rudder is compensated by the eccentricity of the turbine on the opposite side (not represented for clarity's sake). In the sideways position, the turbine (FIG. 16) continues generating, although it has changed of rotation direction while the air traverses it laterally. It is thus necessary to use a generator having an indifferent running direction (for example an alternator).

FIGS. 13 and 14 show the position of additional deflectors 52 and 53 creating the Coanda effect. By using them, the diameter of the gutter can be reduced. This complication is only of interest for large models.

It will be understood that the invention may be embodied in other specific forms without departing from the spirit or essential characteristics thereof. The present examples and embodiments, therefore, are to be considered in all respects as illustrative and not restrictive, and the invention is not to be limited to the details given herein.

I claim:

1. A wind engine characterized in that the propeller is a conical or flat wheel obligatorily surrounded by depression-creating deflectors, and the blades of said propeller, occupying the quasi-totality of the surface, are directly obliquely attached by the wind, in the case of the conical rotor or, in the case of the flat wheel, after deviation by a grid of deflectors, and further characterized in that the air arriving obliquely at the blades, leaves them perpendicularly and disposes in this way of an outlet surface which is larger than the inlet surface and in which a peripheral deflector is provided with slots.

2. A wind engine according to claim 1, characterized in that the peripheral deflector can be provided with deflectors creating the Coanda effect.

3. A wind engine according to claim 2 characterized in that the peripheral deflector can be flat one (FIG. 8) with or without a cylindrical wall 17 for canalizing the air inwards or outwards.

4. A wind engine according to claim 3 characterized in that the driving cone, formed by oblique blades, can be placed with its front facing the wind, its tight, central part enabling the expansion of the air towards inside.

5. A wind engine according to claim 4 characterized in that the wheel can consist of a cone formed by blades, having its top facing the wind, extended by a frustum of a cone also formed by blades, having its base turned towards the front.

6. A wind engine according to claim 5 characterized in that the multi-bladed wheel can be a flat one if it is preceded by deflectors canalizing the air obliquely towards said blades (FIG. 11).

7. A wind engine comprising:
 a conical rotor having an inlet end and a plurality of blades, said rotor having a central axis and being provided for rotating around said central axis and for being disposed with said central axis substantially parallel to a direction of said incoming wind, said blades occupying substantially a whole outer surface of said conical rotor and being disposed in such a manner as to be directly obliquely attacked by said incoming wind, there being deflecting means adjacent to the inlet end for redirecting incoming wind moving generally parallel to the central axis radially outwardly adjacent to the inlet end of the rotor.

8. A wind engine as claimed in claim 7 wherein each of said blades is provided for deviating said incoming air and outputting it from said rotor in a direction substantially perpendicular to an outer surface of said blade.

9. A wind engine as claimed in claims 7 or 8 wherein said conical rotor has a first part provided for being placed facing said incoming wind and a tight central part provided for enabling an expansion of said incoming wind.

10. A wind engine comprising:
a flat wheel having a plurality of elongate blades surrounded by at least one depression creating deflector, said wheel being provided for rotating around a central axis thereof and for being disposed with said central axis substantially parallel to a direction of said incoming wind, said blades having their lengths projecting substantially radially outwardly with respect to the central axis and occupying substantially a whole surface of said wheel; and a grid of deflectors being provided in front of said wheel for deviating said incoming wind moving substantially parallel to the central axis in order to directly attack said blades.

11. A wind engine as claimed in claim 10 wherein each of said blades is provided for deviating said incoming wind and outputting it in a direction substantially perpendicular to an outer surface of said blades.

12. A wind engine as claimed in claims 7 or 10 wherein said wind engine comprises at least one peripheral deflector.

13. A wind engine as claimed in claims 7 or 10 wherein said wind engine comprises at least one peripheral deflector, said peripheral deflector comprising two vanes disposed substantially parallel to each other.

14. A wind engine as claimed in claims 7 or 10, wherein said wind engine comprises at least one peripheral deflector provided for creating a Coanda effect.

15. A wind engine as claimed in claim 7 having a cylindrical wall for canalizing said wind outwards said rotor.

16. A wind engine as claimed in claim 10 having a cylindrical wall for canalizing said wind outwards said wheel.

* * * * *